of Germany
United States Patent [19]
Schuhmacher et al.

[11] 4,307,004
[45] Dec. 22, 1981

[54] POLYURETHANE UREA HEAT SEAL ADHESIVE FOR THE PREPARATION OF HEAT SEALABLE PADDING MATERIAL

[75] Inventors: Günter Schuhmacher; Erich Fahrbach, both of Weinheim; Gerhard Schaut, Mörlenbach-Weiher, all of Fed. Rep. of Germany

[73] Assignee: Firma Carl Freudenberg, Weinheim, Fed. Rep. of Germany

[21] Appl. No.: 119,835

[22] Filed: Feb. 8, 1980

[30] Foreign Application Priority Data

Feb. 17, 1979 [DE] Fed. Rep. of Germany ....... 2906113

[51] Int. Cl.³ .............................................. C08J 3/00
[52] U.S. Cl. .................................. 260/29.2 TN; 2/87; 156/277; 156/291; 156/331.7; 156/308.2; 428/200; 428/246; 428/423.1; 428/423.3; 528/61; 528/65
[58] Field of Search ............. 156/277, 331, 291, 331.7, 156/308.2; 2/87; 428/200, 423.1, 246, 423.3; 528/61, 65; 260/29.2 TN

[56] References Cited

U.S. PATENT DOCUMENTS

| | | | |
|---|---|---|---|
| 2,968,575 | 1/1961 | Mallonee | 260/29.2 TN |
| 3,252,848 | 5/1966 | Borsellino | 156/331 |
| 3,401,133 | 9/1968 | Grace et al. | 528/61 |
| 3,463,690 | 8/1969 | Converse et al. | 156/291 |
| 3,655,627 | 4/1972 | Hutzler et al. | 528/64 |
| 3,684,639 | 8/1972 | Keberle et al. | 156/331 |
| 4,116,741 | 9/1978 | Thoma et al. | 428/423.3 |
| 4,160,686 | 7/1979 | Niederdellman et al. | 156/331 |

FOREIGN PATENT DOCUMENTS 1379633  1/1975  United Kingdom ..................... 2/87

*Primary Examiner*—John J. Gallagher
*Attorney, Agent, or Firm*—Kenyon & Kenyon

[57] ABSTRACT

The invention disclosed herein relates to a method for bonding the opposing surfaces of textile materials to each other with a heat-seal adhesive. The heat-seal adhesive is a polyurethane urea heat-seal adhesive prepared by first preparing a chain-extended polyurethane from at least one diisocyanate, at least one polydiol, and chain-extenders. The chain-extenders may comprise a mixture of low molecular weight diols comprised of at least one low molecular weight diol having a molecular weight below about 500 and having side chains or ether groups, and at least one unbranched low molecular weight diol having a molecular weight below about 500. The chain-extended polyurethane has a free-isocyanate group content which comprises from about 10 to about 40 mole percent of the isocyanate content of the starting mixture. An emulsifier is added to the chain-extended polyurethane, and the polyurethane and emulsifier mixture is emulsified with water. Diamines or diamine mixtures may be added to the emulsion.

12 Claims, No Drawings

POLYURETHANE UREA HEAT SEAL ADHESIVE FOR THE PREPARATION OF HEAT SEALABLE PADDING MATERIAL

BACKGROUND OF THE INVENTION

Heat sealable padding materials are known. For example, thermoplastics are employed as heat-seal adhesives for planar textile materials. Thermoplastic heat-seal adhesives are applied by wiping thickened pastes or solutions of the adhesive onto the textile, or by sprinkling pourable adhesive powders onto the textile. Moreover, it is also known to spray dispersions or solutions of the adhesive onto the fabric, or to apply the adhesive in the form of a spunbonded fabric. Heat seal adhesives should not adversely affect the soft feel of the textile, and the bonds formed should be resistant to chemical cleaning and washing.

A preferred method for the manufacture of heat-sealable padding materials comprises coating a planar textile fabric, such as the spunbonded fabrics with a heat-seal adhesive. For example, the adhesive may be in paste form, and may be applied to the planar textile material by a paste printing machine and a rotary stencil. The printed padding material is bonded to a second fabric material, by pressing the two textiles together under heat and pressure - for example, by hot-ironing the fabrics.

Plastics suitable for use as heat-seal adhesives are known. For example, polyethylenes which soften or melt at temperatures of from about 90° C. to about 130° C. are suitable for use as heat-seal adhesives. However, bonds formed from polyethylene heat-seal adhesives do not stand up well to cleaning with chemical cleaning agents such as perchloroethylene, since the polyethylenes are soluble in perchloroethylene, and swell in the presence of perchloroethylene. Thus, during cleaning a polyethylene adhesive may separate from the substrate fabric to which it was previously bonded. Moreover, the resistance of polyethylene adhesives to washing with conventional detergents is not always adequate.

Soft, powdered polyvinylchloride has also been employed as a heat-seal adhesive. However, plasticizers must be added to printing pastes prepared from polyvinylchloride adhesives. These plasticizers are volatile at the temperatures employed during the ironing or sintering process. Thus, the use of polyvinylchloride pastes results in a hardening of the textiles to which the adhesive is applied. Moreover, textiles to which polyvinylchloride pastes have been applied may also harden gradually at room temperature. For the same reasons, mixed polyvinylchloride-polyvinylacetate polymers which require large amounts of plasticizers when employed as hot adhesives may be considered unsuitable for use in many cases.

Polyurethane, heat-seal adhesives useful for cementing together textile fabrics are described in German Pat. No. 1,930,340 and DE-OS 1769-482. The polyurethanes described in these references have good adhesive strength. However, they are relatively hard and, therefore, padding material which has been coated with these polyurethane adhesives, after being cemented to one outer layer of fabric material, results in a fabric product having an undesirable, hard or stiff feel. This same hard or stiff feel is produced when polyamide heat-seal adhesives are employed.

The polyurethanes disclosed in the above-cited German Pat. No. 1,930,340 may be applied in the form of a printable paste, or may be sprinkled onto the textile by the powder-sprinkling method or the powder-dot method. However, prior to their use as heat-seal adhesives they must be comminuted. This necessitates an expensive milling process which results in granulate polyurethane having a particle size in the range of from 1 to 80 μm. Due to the intense heat produced during the milling step, the granulate must be cooled. This cooling may be accomplished with liquid nitrogen. The polyurethane particles produced by this process have a very non-uniform morphology. Thus, in light of the disadvantages associated with the polyurethane adhesives disclosed by the cited reference, the usefulness of these polyurethanes is limited—despite their basically good adhesive properties.

BRIEF DESCRIPTION OF THE INVENTION

It is an object of the present invention to provide heat-seal adhesives which are well suited for application to padding materials, such as spunbonded fabric materials, and which have good adhesive strength. Heat sealable padding materials may be prepared by applying the instant polyurethane ureas to padding materials by printing the adhesive in paste form onto the padding.

Significantly, the polyurethane urea adhesives of this invention are suitable for application to sensitive or thin outer-garment fabrics such as poplin fabrics often employed in the manufacture of rain-wear. Fabrics bonded with the polyurethane ureas described herein are resistant to chemical cleaners such as perchloroethylene as well as to washing. The polyurethane heat-seal adhesives are applied to a carrier fabric by the paste printing method, or by one of the other heat-seal adhesive application methods mentioned above.

In accordance with the above, the present invention provides a method for bonding the opposing surfaces of textile materials to each other with a heat-seal adhesive which comprises:

a. applying a heat-seal adhesive to at least one of the opposing surfaces of said textiles and
b. pressing the opposing surfaces of said textiles together under heat and pressure to heat-seal said opposing textile surfaces together, wherein
c. said heat-seal adhesive is a polyurethane urea heat-seal adhesive prepared by
1. preparing a chain-extended polyurethane from at least one diisocyanate, at least one polydiol, and chain-extenders; said chain extenders being comprised of at least one low molecular weight diol having a molecular weight below about 500 and having side chains or ether groups, and at least one unbranched low molecular weight diol having a molecular weight below about 500; said chain-extended polyurethane having a free-isocyanate group content which comprises from about 10 to about 40 mole percent of the isocyanate content of the starting mixture; followed by
2. the addition of an emulsifier to said chain-extended polyurethane, and
3. emulsifying said emulsifier and polyurethane mixture by the addition of water to said mixture.

The polyurethane urea heat-seal adhesive described above is very soft and flexible. Thus, when employed as heat-seal adhesives they result in bonded fabrics having a soft textile feel, regardless of the outer-garment fabrics treated. This is true even where the adhesive is to be applied under very difficult conditions such as where the adhesive is applied to a fabric which includes an outer-polyurethane coat.

DETAILED DESCRIPTION OF THE INVENTION

Suitable polyols for use in the preparation of the polyurethane ureas employed by the method of this invention have a molecular weight of from about 1000 to 2000 and, preferably, have two hydroxyl groups per molecule. Thus, preferable polyols include the polyester, polyether, polythioether, polyacetal, polycarbonate and polyesteramide—polyols.

The use of mixtures of two or more different reactants of the same class, i.e., mixtures of different polyols and/or mixtures of different diisocyanates, has the effect of lowering the melting point of the product. This is particularly true for the diamine mixtures which are employed by the method of this invention. This, if a diamine mixture is employed consisting of 1,6-hexamethylene diamine and 2,2,3-trimethyl-1,6-hexamethylene diamine in a ratio of about 1:1, the product may have a melting point about 15° to 20° lower than the melting point of the corresponding polyurethane urea prepared employing only hexamethylene diamine. The lowering of the melting point is also aided by the trimethyl side groups of the diamine. A similar melting point lowering effect results from the use of branched low molecular weight diols as chain extenders.

Chain extender agents for isocyanate prepolymers are compounds which carry, per molecule, at least two active hydrogen atoms and have a molecular weight of from about 52 to about 500, and preferably, from about 62 to about 250. These compounds react with the isocyanate groups of the prepolymer and build up high molecular weight polyurethane ureas by linking several isocyanate prepolymer molecules. This chain-extending reaction per se is known and, as a rule, leads to very high molecular weight products having melting points above about 200° C. As mentioned above, such polyurethane materials may be unsuitable for many uses. In accordance with this invention the melting point of the polyurethane urea product is below 200° C., and, preferably, between about 100° and about 150° C. The chain extension is, therefore, carried out only to the extent that from about 10 to about 40%, and preferably from about 15 to about 30% of free isocyanate, based on the isocyanate content of the starting mixture, is unreacted.

In addition to the bifunctional chain extenders mentioned above, monofunctional chain extenders such as monofunctional amides, amines, alcohols or the like may be employed. Suitable compounds of this type are ε-caprolactam, dibutyl amine and neopentyl alcohol.

In accordance with the present invention, the melting point of the polyurethane urea product is controlled by the extent of chain extension. In this regard it should be noted that when the content of monofunctional chain extenders exceeds about 5 mole percent, based on the isocyanate content of the starting mixture, the melting point and, in particular, the strength of the product drops in an undesirable manner, such that the product polyurethane ureas are no longer suitable for use as adhesives for insert materials. However, up to about 5 mole percent, and preferably up to about 3 mole percent of the isocyanate content of the prepolymer may be converted to urethane groups by reaction with monofunctional compounds containing active hydrogen atoms, without appreciably affecting the strength of the polyurethane-urea product. This reaction may lower the melting point of the product by about 15° to about 30° C.

It is surprising that without the use of organic solvents, low melting polyurethane ureas with a low urea content can be produced, having properties comparable to polyurethanes which are obtained by conventional processes such as casting, pressing, injection molding or the like. It is, in particular, surprising that they exhibit excellent strength and elasticity properties at the desired low melting point. The polyurethane ureas produced in accordance with the method of this invention are useful as, for example, powders for whirl sintering, adhesives, and as binders for artificial leather. The shape and size of the powder particles can be varied in a reproducible manner, as desired for the intended end use.

The melting points or melting ranges of the polyurethane ureas prepared in accordance with the method of this invention are between about 90° and about 200° C., and preferably between about 100° and about 150° C.

Particularly soft polyurethane ureas are obtained from a reaction mixture, the diisocyanate content of which is less than about 60 parts by weight, based on about 100 parts by weight of the polydiol. Preferably the reaction mixture contains from about 25 to about 50 parts by weight diisocyanate, based on about 100 parts by weight of a polyester having an average molecular weight of about 2000.

The prepolymer is produced in a known manner by reaction of high molecular weight diols, and diisocyanates at temperatures of from about 70° to about 130° C., the reaction time being matched to the predetermined temperature, for example, 2 hours at about 120° C. Reaction time is intended to refer to the duration of the reaction of all reaction partners, i.e., the high molecular weight polydiols, diisocyanates, as well as the low molecular weight diols discussed below. The low molecular weight diols may be added to the high molecular weight polydiol before the diisocyanate is added, or alternatively after the diisocyanate is added, for example, about 60 minutes after the diisocyanate is added. In general, the reaction conditions should be chosen so that the temperature in the reaction mixture does not rise above about 135° C.; in this regard the highly exothermic nature of the urethane formation should be taken into consideration.

High molecular weight diols include polydiols having a molecular weight of from about 500 to about 5000, and preferably from about 1000 to about 2000. Such polydiols include polyesters with OH-groups in the end positions, for example, polyesters formed with dicarboxylic acids such as adipic acid, sebacic acid, azelaic acid, and glycols such as ethylene glycol, 1,3-propylene glycol, 1,4-butane diol, neopentyl glycol, 1,6-hexane diol or glycol mixtures. For the preparation of the polyesters, as an alternative to free carboxylic acids, the corresponding polycarboxylic acid anhydrides or polycarboxylic acid esters of lower alcohols and mixtures thereof may be employed. The polycarboxylic acids may be of the aliphatic, cycloaliphatic, aromatic and/or heterocyclic type and may optionally be substituted or unsubstituted. Polydiols such as polycaprolactone may also be employed. Polyethers, such as those of the 1,2-propylene oxide type or the tetrahydrofuran type may also be employed as the polyol component.

Diisocyanates, which may be employed in accordance with this invention, may include, for example 4,4'-diphenylmethane-diisocyanate(MDI), 2,4- and 2,6- toluene-diisocyanate (TDI), ditolyl-diisocyanate (TODI), 1,6-hexamethylene-diisocyanate (HDI), isophoron-diisocyanate (IPDI), 2,2,4-trimethyl-1,6-hexamethylene-diisocyanate (TMDI). The prepolymer which includes free isocyanate groups in the end positions and consisting of (n) moles of diisocyanate and (n-1) moles of polydiol, may also include excess low molecular weight diisocyanate. The mole ratio of diisocyanate to polydiol may be from about 30:1 to about 3:1. The mixture of low molecular weight diols may be added to the prepolymer. Alternatively, in accordance with a single step embodiment of the process, the low molecular weight diol mixture may be admixed with the polydiol prior to the diisocyanate reaction step.

The phrase "low molecular weight" as employed herein is intended to refer to molecular weights of from about 62 to about 500, and preferably from about 62 to about 250. The low molecular weight diols having side chains or ether groups contribute to the lowering of the melting point or the melting range of the completely reacted polyurethane urea, as well as the chain-extended prepolymer. Included within this group of low molecular weight diols are: neopentyl glycol, 2,2,-dimethylhexane-1,3-diol, diethylene glycol, triethylene glycol and pentane diol. The completely reacted polyurethane urea has a melting point or melting range within the range of from about 100° to about 200° C. The chain-extended prepolymer wherein from about 60% to about 90% of the isocyanate groups have been converted to urethane groups has a melting point below about 100° C. and preferably about 80° C.

The second group of diols employed in the low molecular weight diol mixture contributes substantially to improving the strength of the product. However, if the first melting point lowering group of diols were not also included in the diol mixture, the melting point or melting range of the chain-extended prepolymer and polyurethane urea produced through the use of only this second group of diols would be unacceptably high. The second group of diols includes unbranched low molecular weight diols such as ethylene glycol, 1,4-butane diol and 1,6-hexane diol. The diols of the second group may be added alone or as a mixture of two or more unbranched diols.

In the low molecular weight diol mixture, the mole ratio of the melting point lowering diols to the strength enhancing diols may be from about 25:75 up to about 60:40, and preferably of about 30:70 up to about 45:55. Among the monofunctional compounds carrying an active hydrogen, which may be added in small amounts to the chain-extended prepolymer, are, for example, neopentyl alcohol, dibutylamine and/or ε-caprolactam.

The low molecular weight diol mixture described above preferably consists of at least one diol for lowering the melting point, and advantageously of two or more diols which enhance the strength of the product. The low molecular weight diols are employed in amounts and amount ratios such that the polyurethane having isocyanate end groups, and which is chain-extended by the addition of the diols, remains liquid at temperatures below about 100° C. and preferably below 90° C., while at least from about 60 to about 90 mole percent, and preferably about 70 to about 85 mole percent of the originally (i.e., prior to the start of the polyurethane reaction) present isocyanate groups are reacted to urethane groups by the addition of the diols.

The prepolymers prepared from the diisocyanate and the above-described high molecular weight diols form a diurethane diisocyanate, which, as mentioned above, may include excess diisocyanate. A mixture of branched and/or ether group containing low molecular weight diols such as neopentyl glycol, 2,2-diethylpropane-1,3-diol and/or diethylene glycol may be added to this prepolymer as the chain extender. A polyurethane urea product having excellent strength properties such as tensile strength, ultimate percent elongation, and tear propagation resistance properties is obtained when straight chain low molecular weight diols and diamines or diamine mixtures are also employed in a chain extender mixture. As will be described below the diamines or diamine mixtures are added after the extended prepolymer is dispersed in water.

A water-free, nonionic emulsifier containing no active hydrogen atoms is added to the chain-extended prepolymer. Suitable emulsifiers are commercially available, for example, under the designation ethoxylated ricinol oil or ethoxylated fatty alcohols. The amount of emulsifier employed affects the particle size of the polyurethane urea powder. The particle sizes which can vary over a wide range are reduced with increasing emulsifier content.

For a polyurethane urea powder with a particle size under 100 μm, emulsifier is added to the prepolymer in quantities of from about 5 to about 15 parts, per 100 parts of chain-extended prepolymer. The prepolymer-emulsifier mixture may be at a temperature of about 100° C., and exhibits at this temperature viscosities of from about 5000 to about 20,000 centipoise. To this prepolymer-emulsifier mixture, water at a temperature of about 90° C. is added with vigorous stirring. The hot water added during this step is generally not cooler than about 70° C., and is preferably at a temperature of from about 90° to about 95° C. The mixing is done quickly and should take about 5 minutes and at the most about 10 minutes. The ratio of the amount of water to prepolymer-emulsifier mixture is about 1:1, and is apportioned so that the transition of the "water-in-oil" emulsion into low-viscosity "oil-in-water" emulsion is almost complete. Then, water at a temperature of from about 15° to about 25° C. is stirred into the oil-in-water emulsion. Preferably, the amount of cold water added, i.e. water at about 15° to about 25° C. is added in amounts about four to five times as great as the amount of warm water employed, i.e., water at a temperature of about 90° to about 95° C. added during the first water addition step. The diamine or the diamine mixture is then added. The quantity of diamine added may be stoichiometric, based on the free isocyanate groups present, or, alternatively, a stoichiometric deficiency of diamine may be employed. Besides influencing the property pattern, the addition of diamine enhances the rate of completion of the polyurethane reaction and thus, the further processing of the polyurethane urea powders. Corresponding to the low molecular weight diols, the diamines may be unbranched or branched diamines having side chains. The use of branched diamines has a distinct melting point lowering effect.

As mentioned above, it is possible to emulsify the prepolymer through the use of a suitable nonionic emulsifier and water of greater than about 70° C., and preferably at about 90° to 95° C. The free isocyanate groups remaining after the diol addition may comprise about 40 mole percent, and preferably from about 15 to about 30 mole percent of the isocyanate content of the starting reaction mixture. The free isocyanate groups are converted into urea groups by the water treatment and/or the diamine treatment step. This reaction does not cause an appreciable increase in the melting point as compared to the melting point of the corresponding pure, i.e., urea-group free polyurethane. If the chain-extended polyurethane which has been emulsified with hot water is diluted quickly, i.e., within about five to about ten minutes with cold water, wherein about four to five times the amount of cold water as warm water is employed, then only a small portion, i.e., about 1 to about 4 mole percent of the originally, (i.e., prior to the addition of the hot water) present isocyanate groups are converted to urea groups by the treatment with water. Thus, it is possible to vary the chemical structure, and thereby also the properties of the polyurethane urea product by adding to the aqueous dispersion diamines or diamine mixtures which are known to react substantially faster than water.

After several hours, preferably more than about 10 hours, the polyurethane powder is recovered from the water by filtration or centrifugation. The recovered polyurethane urea powder contains from about 30 to about 50 percent water. Completely dry powder may be obtained, for example, by drying the powder in a circulating air cabinet at about 60° C. for about 24 hours. Additives such as fillers, pigments, anti-aging agents, etc. can be added before, during, or after the dispersion.

In accordance with the prepolymer preparation of this invention, a polyol mixture can be used instead of a high molecular polyol, and a diisocyanate mixtuure instead of a diisocyanate. In accordance with the method of the present invention, soft, low melting polyurethane ureas are obtained.

Thus, the method of manufacturing the polyurethane urea powders of this invention may be summarized as follows:

1. Preparation of the prepolymer
2. Chain extension of the prepolymer
3. Stirring a suitable emulsifier into the prepolymer
4. Emulsifying the prepolymer in hot water
5. Dilution with cold water, or, alternatively, dilution first with hot water, and then with cold water, to form an "oil-in-water" emulsion.
6. Addition of diamines for end cross-linking
7. Filtration and centrifugation; washing and drying of the powder.

The preparation of the polyurethane ureas cann be carried out batch-wise or in a continuous manner.

Advantageously, the polyurethane ureas when intended for use in printing pastes need not be comminuted or milled since they are prepared in the form of a finely dispersed aqueous dispersion of the polyurethane urea. The product particles are very uniform in size, ranging from about 1 to 80 μm. The polyurethane powder produced by the method of this invention has a very fine grain, as well as a powder size optional for the paste printing method.

Surprisingly, the polyurethane ureas prepared as described above, may be employed in the form of a moist powder having a solids content of about 50%. A moist powder which may be employed in the preparation of a printable paste is obtained merely by filtering the aqueous dispersion of the polyurethane urea without any additional drying.

To prepare a printable paste having a solids content of from about 35 to 40% by weight, the filtered moist polyurethane urea powder is diluted with water, and thickened with a suitable thickener, until a paste having the desired consistency is obtained. Suitable thickeners include cellulose derivatives, a polyacrylate or a polymethacrylate. A residual amount of the nonionic emulsifier employed during the preparation of the polyurethane urea aids in the preparation of the paste, since it aids in the dispersion of the polyurethane urea powder in the water. In the presence of small amounts of nonionic emulsifier the moist polyurethane urea powder is readily dispersed in the water employed to prepare the printing paste.

The printing paste is homogeneous and does not sedimentate even upon standing for an extended period of time. Thus, the use of suspension agents customarily employed in printing pastes, such as those disclosed in German Pat. Nos. 2,007,971 and 2,229,308, is not required by the printing pastes of this invention. Moreover, plasticizers are not employed in the printable pastes of this invention. Rather, as described above, the pastes of this invention require only the addition of thickeners and small amounts of an emulsifier.

The polyurethane ureas are very soft and flexible. In order to retain these desirable properties of the adhesive subsequent to the hot-ironing of padding which has been treated with the adhesive, it is important to employ thickeners which do not result in a decline in the softness, flexibility or adhesive strength of the polyurethane during the ironing of the padding material. Thickeners which harden, such as those which are employed in polyamide coated padding materials, when employed as the thickener component of the pastes of this invention, result in a considerable decline in the strength of the adhesive bond produced during the ironing step. This is especially true when low setting temperatures are employed. The loss of adhesive strength resulting from the use of incompatible thickeners is especially important where, as is customary, the adhesive is applied to the padding fabric in amounts of about 12 to 20 g/m$^2$. When such small amounts of a meltable adhesive are employed, it must be insured that the "adhesion readiness" of the meltable adhesive is not disturbed by the inclusion of an incompatible thickener in the polyurethane printing paste.

Thus, in selecting thickeners and emulsions for use in the printing paste formulation it may be necessary to perform preliminary tests to ensure the compatibility of the adhesive and additives, under the setting or ironing conditions employed. However, it has been found that polyurethane based thickeners are particularly well suited for use as the thickener component of the printing paste. Particularly suitable polyurethane based thickeners are commercially available as a water/glycol solution of the thickener, and are sold under the tradenames Collacral LR8500 or Borchigel. These thickeners result in extremely small rupture elongation losses and, therefore, result in only slight changes in properties upon melting the adhesives. Up to about 8% by weight of the thickener, based on the weight of the polyurethane solids in the paste, may be employed.

The thickeners of the polyvinyl pyrrolidone type are also highly suitable for use as the thickener component of the paste. Polyvinyl pyrrolidone thickeners are employed in amounts of up to 6% by weight of the polyurethane content of the paste.

Paste thickening agents of the polyacrylatepolymethacrylate type which are customarily employed, should not be employed in the printing pastes described herein or, if employed, should only be employed in limited amounts. If polyacrylatepolymethacrylate thickeners are employed, they should not be employed in amounts greater than about 3% by weight of the polyurethane content of the printing paste. The use of greater amounts of thickeners of this type can result in a degradation of the properties of the adhesive. Moreover with regard to the polyacrylate thickeners only long-chain polyacrylic acids or their salts, which are not pre-crosslinked should be employed.

As mentioned above, preliminary tests may be employed to determine which thickeners or emulsifiers result in a loss of the desired softness, flexibility and adhesive strengthh of the adhesive. Such a preliminary test may consist of drawing the various paste samples into films of uniform thickness, and then drying and tempering the film in a circulating-air oven at 150° C. After removing the film samples from the oven, and cooling them, test pieces are stamped from the film and the percent elongation is measured in a standard manner. A control sample is prepared from a film containing only the pure polyurethane urea adhesive. If the ultimate percent elongation of the film sample which includes the paste hardening thickener and emulsifier additives is lowered by greater than 60% as compared to the control sample, insert materials printed with such a paste composition will suffer a loss of softness and adhesive strength. It should be noted that the decline in ultimate percent elongation depends not only on the kind of additives employed but also on the amounts of additives employed. Thus, on the basis of the test described above, it is possible to determine which paste compositions are suitable for use—as well as, the optimum and permissible amounts of past additives.

The phrase "insert material" or "padding material" is intended to refer to fabrics which may be employed as interlinings for outer garment fabrics. For example, insert materials may be comprised of various spun-bonded fabrics, in particular, the insert material may be a fabric comprised of polyamide and polyester staple fibers which are arranged in a lengthwise-oriented layer and a crosswise-oriented layer. The layers are bonded to each other in a conventional manner, with an acrylate binder.

Since the emulsifier additives are employed in the paste compositions in small amounts, their effect on the properties of the polyurethane heat-seal adhesives is less than the effect of the thickeners which are employed in greater amounts.

As mentioned above, the polyurethane ureas employed herein are prepared in a finely dispersed form, and need not be milled prior to incorporation in the printing paste. As a result of the advantageous morphology of the polyurethane urea particles, the pastes prepared from these adhesives require only the addition of a thickener and a small amount of an emulsifier. In paste form the adhesives are suitable for use on silk screen stencils having very small hole diameters and with rasters of about 25 to 40 mesh—even at high process speeds. Unlike milled polyurethane powders which have a very rough surface, the polyurethane powders, prepared as described herein, have a nearly spherical shape and a smooth surface. In the absence of lubricants, adhesive powders with rough surfaces do not print as well as adhesive powders with smooth surfaces.

When printing fine dots, the resitance of adhesive pastes to being printed through very fine stencil holes is so great, that shear forces occur which destroy the homogeneity of the paste dispersion. This renders the use of known adhesive pastes unsuitable for the printing of fine dots. However, this difficulty is eliminated through the use of the polyurethane urea pastes of this invention.

Advantageously, the polyurethane paste compositions of this invention do not require the additives customarily employed in copolyamide, polyester and polyethylene adhesive compositions. Paste additives negatively affect the feel and adhesive strength of the paste, as well as the resistance of the adhesive to chemical cleaners and washing. Moreover, such additives have a tendency to penetrate into textile materials. Since the polyurethane urea pastes of this invention require only a small amount of an emulsifier and a thickener, the difficulties associated with the additives employed by known polyester, polyamide and polyethylene pastes are eliminated through the use of the printing pastes described herein.

The polyurethane ureas of the present invention have melting points in the range of from about 90° to about 140° C. and preferably from about 110° C. to about 135° C. They have a very broad softening range and a high melting viscosity—i.e., they are very "tough" in the melted state. As a result of their "toughness" fabric insert materials such as fibrous web materials which are coated with the polyurethane urea powders, are not penetrated by the adhesive during the setting process, which is performed at a temperature above the melting point of the heatseal adhesive.

Despite their high viscosity upon melting, the melted polyurethane urea powders exhibit very good adhesive strength even when relatively mild setting temperatures are employed. Thus, it is possible to iron a fibrous web material coated with a sufficient amount of the adhesive to an outer fabric material within a broad range of ironing temperatures, i.e., at ironing temperatures of from about 100° to 170° C. Appreciable differences in the separation strength of the adhesive bond set within this temperature range is not observed. Known heat-seal adhesives cannot be set within this broad temperature range unless additives such as plasticizers are employed in combination with the adhesive Plasticizers need not be employed in the printing pastes of the present invention. The use of plasticizers necessarily results in a reduction of the melting viscosity which, in turn, results in low separation strengths for bonds set at high temperatures. This reduction in the viscosity of the melted adhesive causes the adhesive to become "thin". Thus, during setting, the adhesive may penetrate the carrier fabric before the adhesion of the carrier fabric to the outer fabric layer can occur.

New, fine poplin fabrics for use in the manufacture of rain-wear are commercially available. However, these fabrics include a chemical coating, which in most cases is polyurethane, over the surface of the fabric to which the heat-sealable adhesive is to be applied. The polyurethane ureas described herein may be employed in the preparation of heat-sealable insert materials for application of these poplin fabrics. The adhesive is preferably applied to the insert by the paste-printing, hotmelt method, although the heat-seal adhesive may be applied by other conventional application processes, such as those mentioned above.

Known heat-seal adhesives such as the polyethylene and copolyamide adhesives result in a totally insufficient bond when applied to polyurethane coated poplin fabrics. The inadequate adhesion results regardless of whether the adhesive is applied by the paste printing, powder dot, or sprinkle method. Although mixed polyvinylchloride-polyvinylacetate polymers employed in combination with large amounts of plasticizer result in somewhat better adhesion, the setting conditions required, such as the pressure and temperature of the ironing press are so high that the surface appearance of the bonded fabric is poor. Moreover, the plasticizer which must be present in such heat-seal adhesives to a great extent adversely alters the effectiveness of the polyurethane coating of the poplin fabric.

Insert materials printed with the polyurethane urea pastes described herein unexpectedly exhibit excellent "adhesion readiness" for outer-garment fabrics, such as the polyurethane coated poplin fabrics discussed above. Very mild setting conditions can be employed because good adhesion is obtained at ironing temperatures of from about 100° to about 150° C. employing electric ironing presses. When a laminate is prepared comprised of a heat-sealable insert fabric bonded to a polyurethane coated poplin fabric, the outer surface of the poplin fabric retains a smooth appearance and texture. The well known "orange peel effect" which occurs upon the setting of polyvinylchloridepolyvinylacetate heat-seal adhesives does not occur.

Moreover, if the insert fabric which has been coated with polyurethane adhesive is ironed to a polyurethane coated fabric at temperatures of from about 130° to about 150° C., the polyurethane adhesive bonds by fusion with the polyurethane coating of the fabric. Because of its high viscosity upon melting, the polyurethane adhesive does not penetrate into the carrier-insert fabric but rather becomes strongly fused to the polyurethane coating of the fabric. That is, at ironing temperatures the melted polyurethane adhesives fuse to the polyurethane coating of the fabric, which also softens at ironing temperatures. In the set bond, therefore, reinforcement of the outer coating material occurs only to a limited extent, so that no damage to the coating takes place. Such a danger is presented, however, by the use of melting adhesives which contain softeners.

The following examples serve to illustrate the invention but are not intended as a limitation thereon.

EXAMPLE 1

100.0 g of a polybutylene glycol-ethylene glycol adipic acid polyester with an OH-number of 56 (molecular weight 2000)
7.28 g neopentyl glycol
6.30 g 1,4-butane diol
7.08 g 1,6-hexane diol
50.00 g 1,6-hexamethylene-diisocyanate
1.80 g ε-caprolactam are heated together to about 60° C. while being stirred. The temperature then increases to about 120° C. without the addition of external heat. The temperature is kept constant for 2 hours, and the mixture is stirred for 2 hours. ε-caprolactam is added 15 minutes before the end of the reaction. Then, 17.0 g of an ethoxylated castor oil (trade name: Emulan ® EL) are mixed in. The mixture is cooled down to 100° C. (viscosity: 15,000 centipoise). Then 170 cm³ water at a temperature of 90° C. is mixed with the prepolymer-emulsifier mixture over a 3 minute period. During the water addition step the mixture is vigorously stirred with a high speed laboratory stirrer equipped with a dispersion disc. Immediately upon completion of the water addition step, another 660 cm³ of water at 20° C. is added to the mixture. The temperature of the dispersion drops to about 35° C. Then, a mixture consisting of
2.3 g 1,6-hexamethylene diamine and
3.0 g 2,2,4-trimethyl-1,6-hexamethylene diamine
is stirred in. After about 4 hours, a powder formed and settled. After about 24 hours, the water was separated from the powder by means of a laboratory centrifuge. The moist matter was slurried in about 500 cm³ of water and centrifuged again. Finally, the powder was dried for 24 hours at 60° C.

| Properties of the Dried Powder | |
|---|---|
| Melting Range: (measured on the Kofler heating bank) | 100 to 120° C. |
| Melting index: (2.16 kg at 150° C.) | 5 g/10 min. |

From the powder, foils 0.3 mm thick were pressed at 140° C., which had the following strength properties:

| | |
|---|---|
| Tensile strength (N/mm²): (DIN 53371) | 29.7 |
| Ultimate elongation (%): (DIN 53371) | 1340 |
| Tear propagation resistance (N/mm): (DIN 53356) | 63.8 |

The diameter of the spherical powder particles is between 10 and 80 μm, the major portion is around 60 μm.

EXAMPLE 2

100.0 g of a polybutylene glycol-ethylene glycol adipic acid polyester with an OH-number of 56 and a molecular weight of 2000.
5.20 g neopentyl glycol
4.50 g 1,4-butane diol
4.72 g 1,6-hexane diol
40.00 g 1,6-hexamethylene-diisocyanate
1.80 g ε-caprolactam
15.00 g ethoxylated castor oil (Emulan ® EL)
2.30 g 1,6-hexamethylene diamine
3.10 g 2,2,4-trimethyl-1-6-hexamethylene diamine
170.0 cm³ water of 90° C.
660.0 cm³ water of 20° C.

A polyurethane urea powder was prepared from the abovelisted components in accordance with the procedures of Example 1.

| Properties of the Dried Powder: | |
|---|---|
| Melting Range: (Kofler heating bank) | 110 to 120° C. |
| Melting index: (2.15 kg at 105° C.) | 10 g/10 min |
| Strength Properties of a Pressed Foil 0.3 mm Thick: | |
| Tensile strength (N/mm²): (as per DIN 53371) | 25.2 |
| Ultimate elongation (%): (as per DIN 53371) | 1670 |
| Tear propagation resistance (N/mm): (as per 53356) | 56.3 |
| Diameter of the powder particles: | 10 to 80 μm |

EXAMPLE 3

100.0 g of a polybutylene glycol-ethylene glycol adipic acid polyester with an OH-number of 56 (molecular weight 2000)
5.20 g neopentyl glycol
4.50 g 1,4-butane diol 4.72 g 1,6-hexane diol
40.00 g 1,6-hexamethylene-diisocyanate
15.00 g ethoxylated castor oil (Emulan ® EL)
2.30 g 1,6-hexamethylene diamine
3.10 g 2,2,4-trimethyl-1,6-hexamethylene diamine
170.0 cm³ water of 90° C.
660.0 cm³ water of 20° C.

A polyurethane urea powder was prepared from the abovelisted components in accordance with the procedure of Example 1.

| Properties of the Dried Powder | |
|---|---|
| Melting range: (Kofler heating bank) | 135 to 140° C. |
| Melting index: (2.16 kg at 150° C.) | <1 g/10 min |
| Strength Properties of a Pressed Foil 0.3 mm Thick | |
| Tensile strength (N/mm²): (as per DIN 53371) | 29.8 |
| Ultimate elongation (%): (as per DIN 53371) | 1760 |
| Tear propagation resistance (N/mm): (as per DIN 53356) | 51.7 |
| Diameter of the powder particles: | 10 to 80 μm |

Unlike the polyurethane urea of Example 2, ε-caprolactam was not employed in the preparation of the polyurethane urea of this Example. The melting range of the product of this Example is 25% higher. However, the melting index of the product of Example 3 is distinctly lower than the melting index of the product of Example 2.

EXAMPLE 4

100.0 g of a polybutylene glycol-ethylene glycol adipic acid polyester with an OH-number of 56 (molecular weight 2000)
5.20 g neopentyl glycol
4.50 g 1,4-butane diol
4.72 g 1,6-hexane diol
40.00 g 1,6-hexamethylene-diisocyanate
1.80 g ε-caprolactam
15.00 g ethoxylated castor oil (Emulan ® EL)
4.60 g 1,6-hexamethylene diamine
170.0 cm³ water of 90° C.
660.0 cm³ water of 20° C.

A polyurethane urea was prepared from the abovelisted components in accordance with the procedure of Example 1.

| Properties of the Dried Powder | |
|---|---|
| Melting range: (Kofler heating bank) | 130 to 140° C. |
| Melting index: (2.16 kg at 150° C.) | 4.5 g/10 min |

Unlike the polyurethane urea of Example 2, this polyurethane urea contains no 2,2,4-trimethyl-1,6-hexamethylene diamine; the 1,6-hexamethylene diamine content was increased accordingly in an equivalent manner.

As compared to the polyurethane urea of Example 2, the melting range and the melting viscosity of the product of this Example are distinctly higher.

EXAMPLE 5

100.0 g of a polybutylene glycol-ethylene glycol adipic acid polyester with an OH-number of 56 (molecular weight 2000)
3.12 g neopentyl glycol
2.70 g 1,4-butane diol
2.36 g 1,6-hexane diol
30.00 g 1,6-hexamethylene-diisocyanate
1.80 g ε-caprolactam
14.00 g ethoxylated castor oil (Emulan ® EL)
2.30 g 1,6-hexamethylene diamine
3.10 g 2,2,4-trimethyl-1,6-hexamethylene diamine
140.0 cm³ water of 90° C.
560.0 cm³ water of 20° C.

A polyurethane urea was prepared from the abovelisted components in accordance with the procedure of Example 1.

| Properties of the Dried Powder | |
|---|---|
| Melting range: (Kofler heating bank) | 110 to 120° C. |
| Melting index: (2.16 kg at 150° C.) | 14.0 g/10 min |
| Strength Properties of a Pressed Foil 0.3 mm Thick | |
| Tensile strength (N/mm²): (as per DIN 53371) | 15.6 |
| Ultimate elongation (%): (as per DIN 53371) | 1750 |
| Tear propagation resistance (N/mm): (as per DIN 53356) | 41.8 |
| Diameter of the powder particles: | 10 to 70 μm |

EXAMPLE 6 (Reference Test)

100.0 g of a polybutylene glycol-ethylene glycol adipic acid polyester with an OH-number of 56 (molecular weight 2000)
7.28 g neopentyl glycol
1.80 g 1,4-butane diol
30.0 g 1,6-hexamethylene-diisocyanate
2.70 g ε-caprolactam
14.0 g (Emulan ® EL) ethoxylated castor oil
3.0 g 1,6-hexamethylene diamine
140.0 cm³ water of 90° C.
560.0 cm³ water of 20° C.

A polyurethane urea was prepared from the abovelisted components in accordance with the procedure of Example 1.

| Properties of the Dried Powder: | |
|---|---|
| Melting range: (Kofler heating bank) | 115 to 125° C. |
| Melting index: (2.16 kg at 150° C.) | 12.0 g/10 min |
| Strength Properties of a Pressed Foil at 0.3 mm Thick | |
| Tensile strength (N/mm²): (as per DIN 53371) | 8.1 |
| Ultimate elongation (%): (as per DIN 53371) | 1150 |
| Tear propagation resistance (N/mm): (as per DIN 53356) | 34.5 |
| Diameter of the powder particles: | 10 to 80 μm |

The neopentyl glycol content is substantially higher than the 1,4-butane diol content; more than 5% of the isocyanate content was converted into urethane by ε-caprolactam. The tensile strength is considerably lower than in the preceding Examples.

EXAMPLE 7

A printing paste is prepared from a polyurethane urea dispersion which contains 50% by weight solids, and a particle size of between about 1 and 80 μm. The polyurethane urea has a melting point of 115° C. and a melting index of about 10 g/10 minutes, measured as per DIN 53735 at 150° C. and a load of 2.16 kg.

2000 parts by weight of the polyurethane urea powder is diluted with 910 parts by weight water. With stirring, 10 parts by weight of a nonionic emulsifier such as an ethoxylated ricinoleic acid emulsifier is added, and a thin homogeneous dispersion is produced. 80 parts by weight of a polyurethane based thickener solution is slowly stirred in to thicken the mixture. The thickened mixture is homogenized for a brief period of time to provide a smooth printing paste having a solids content of 35% by weight. The viscosity of the paste is about 12,000 centipoises as measured with a Brookfield viscosimeter. The thickener added comprised about 4% by weight, of the polyurethane urea powder employed.

EXAMPLE 8

A printing paste is prepared in accordance with the procedure of Example 7 except that the paste is thickened with an aqueous solution of vinylpyrrolidone copolymers, up to a viscosity of from about 12,000 to about 15,000 centipoises. The thickener is added in an amount corresponding to about 4.5% by weight of the polyurethane urea content of the paste. The solids content of the paste is adjusted to about 35% by weight.

EXAMPLE 9

A printing paste is prepared as described in Example 7 except that the paste is thickened by stirring-in an ammonia solution of a thickener of the polyacrylic type. The thickener is a long-chained polyacrylic which has not been pre-crosslinked. The thickener is added in an amount corresponding to about 3% by weight of the polyurethane urea content of the paste. The viscosity of the paste is adjusted to about 15,000 centipoises, and the solids content of the paste is adjusted to about 35% by weight.

EXAMPLE 10

A printing paste is prepared in accordance with the procedure of Example 7. The paste is printed onto a synthetic spunbonded fabric having a 30 g/m² weight, by means of a paste printing machine and rotary screen stencil having a 25-mesh fine-point raster. The adhesive coating comprises about 14 g/m² of solid material. The printed fabric is dried in a drying channel, is sintered and rolled up.

Sample portions of the printed fabric, which may comprise a fibrous web, are ironed onto a polyester/cotton poplin outer fabric layer at a pressure of 350 mbar for 10 seconds at 110° C., 130° C., 150° C. and 170° C.

Five cm wide strips were stamped from the samples and the separation strength of the laminate was measured as per DIN 54310. The following separation data was obtained in N per 5 cm:

| Ironing temperature: | 110 | 130 | 150 | 170° C. |
| --- | --- | --- | --- | --- |
| Separation strength: | 12.5 | 15.2 | 14.0 | 14.3 N |

Each of the above separation strength values corresponds to the average of three measurements. The samples which were ironed at 150° C. were cleaned three times with perchloroethylene as per DIN 54303. After drying the samples the separation strength was again tested. The average separation strength, based on three measurements was 16.2 N.

In order to measure washability the printed fabric was ironed to a cotton fabric at 150° C. for 10 sec. at a pressure of 350 mbar. The laminate was washed at 60° C. as per DIN 53920 and the separation strength was determined as per DIN 54310. The following data was obtained:

Separation strength after one washing: 12.3 N
Separation strength after five washings: 10.4 N The above separation strength values represent an average of three measurements, and are based on a strip width of 5 cm.

Similar results are obtained with regard to separation strength, chemical cleanability and washability if the pastes described in Examples 8 or 9 are employed in the manner described in this Example.

EXAMPLE 11

Spunbonded insert fabric, which has been coated with adhesive paste as described in Example 10 is ironed with an electric iron, to a polyurethane coated, fine poplin fabric. Samples of the coated insert fabric are pressed to the surface of the poplin fabric which is coated with polyurethane at 120° C. and 150° C. at a pressure of 350 mbar. The separation strength for a 5 cm strip width was measured as per DIN 54310. The following data was obtained:

| Ironing temperature | : | 120° C. | 150° C. |
| --- | --- | --- | --- |
| Initial separation strength | : | 12.7 | 14.5N |
| After chemical cleaning (perchloroethylene) | : | 14.2 | 15.2N |
| After washing at 60° C. | : | 10.0 | 11.7N |

This invention has been described in terms of specific embodiments set forth in detail herein. It should be understood, however, that these are by way of illustration only and that the invention is not necessarily limited thereto. Modifications and variations will be apparent from this disclosure and may be resorted to without departing from the spirit of this invention, as those skilled in the art will readily understand. Accordingly, such variations and modifications of the disclosed embodiments are considered to be within the scope of this invention and the following claims:

We claim:

1. A printable adhesive paste comprising a polyurethane urea heat-seal adhesive, an emulsifier and a thickener; wherein said polyurethane urea is prepared by:
   A. preparing a polyurethane by reacting a diisocyanate, a polyester polyol and a mixture of at least three low molecular weight diols, wherein at least one of said diols has alkyl side chains or includes an ether group and wherein at least one of said diols is unbranched, said diols in said mixture having a molecular weight below about 500; said polyurethane having a free isocyanate group content which comprises from about 10 to about 40 mole percent of the isocyanate content of the starting reactants; followed by B. adding an emulsifier to said polyurethane of step A, and adding water at a temperature above about 70° C. to said emulsifier and polyurethane; followed by C. adding water at a temperature of below about 25° C. to said emulsion to provide an oil-in-water emulsion, and treating said emulsion with a chain extending diamine or diamine mixture.

2. The printable adhesive paste according to claim 1 wherein said low molecular weight diols have a molecular weight between about 60 and 500, and said polyester polyol has an average molecular weight of from about 500 to about 5000.

3. The printable adhesive paste according to claim 2 wherein the mole ratio of said low molecular weight diols having side chains or ether groups, to said unbranched diols is from about 25:75 to 60:40.

4. The printable adhesive paste according to claim 3 wherein said thickener is selected from the group consisting of polyvinyl pyrrolidone thickeners, and polyurethane based thickeners, wherein said thickener is added to said paste in an amount which comprises up to about 8% by weight of the polyurethane content of said paste.

5. The printable adhesive paste according to claim 3 wherein said thickener is a polyacrylic acid or polymethacrylate thickener and wherein said thickener is added to said paste in an amount which equals not more than about 5% by weight of the polyurethane content of said paste.

6. The adhesive paste according to claim 1 wherein said polyurethane is prepared by reacting a solvent-free mixture of said low molecular weight diols, polyester polyol and diisocyanate in the presence of about 5 mole percent of a monofunctional compound based on the isocyanate content of the said mixture, wherein said monofunctional compound is selected from the group consisting of amides, amines, alcohols, $\epsilon$-caprolactam, dibutyl amine and neopentyl alcohol.

7. The adhesive paste according to claim 6 wherein said monofunctional compound is $\epsilon$-caprolactam.

8. The adhesive paste according to claim 1 wherein said polyester polyol is a polybutylene glycol-ethylene glycol-adipic acid polyester having a molecular weight of about 2,000.

9. The adhesive paste according to claim 1 wherein said low molecular weight diols comprise 1,4-butane diol, 1,6-hexane diol and neopentyl glycol.

10. The adhesive paste according to claim 1 wherein said low molecular weight diols comprise 1,4-butane diol, 1,6-hexane diol and neopentyl glycol; said polyester polyol is a polybutylene glycol-ethylene glycol-adipic acid polyester having a molecular weight of about 2000 and a hydroxyl number of about 56, and said diisocyanate is 1,6-hexamethylene diisocyanate.

11. The adhesive paste according to claim 1 wherein said diamine mixture comprises a mixture of 2,2,4-trimethyl-1,6-hexamethylene-diamine and 1,6-hexamethylene-diamine.

12. The adhesive paste according to claim 1 wherein said emulsifier is a nonionic ethoxylated castor oil or ethoxylated fatty alcohol and wherein from about 5 to about 15 parts by weight of said emulsifier are added per 100 parts of said polyurethane.

* * * * *

UNITED STATES PATENT AND TRADEMARK OFFICE
CERTIFICATE OF CORRECTION

PATENT NO. : 4,307,004
DATED : December 22, 1981
INVENTOR(S) : Günter Schuhmacher, Erich Fahrbach and Gerhard Schaut It is certified that error appears in the above—identified patent and that said Letters Patent is hereby corrected as shown below:

In column 3, line 18, delete "This" and insert --Thus--.

In column 7, line 46, delete "cann" and insert --can--.

In column 9, line 11, delete "strengthh" and insert --strength--.

In column 9, line 31, delete "past" and insert --paste--.

In column 10, line 27, delete "heatseal" and insert --heat-seal--.

In column 10, line 57, delete "of" and insert --to--.

In column 12, line 11, delete "100 to 120°C" and insert --110 to 120°C--.

Signed and Sealed this

First Day of June 1982

|SEAL|

Attest:

GERALD J. MOSSINGHOFF

Attesting Officer     Commissioner of Patents and Trademarks